United States Patent [19]

Gonthier et al.

[11] Patent Number: 4,773,821

[45] Date of Patent: Sep. 27, 1988

[54] CONTROL MECHANISM FOR VARIABLY SETTABLE VANES OF A FLOW STRAIGHTENER IN A TURBINE PLANT

[75] Inventors: Francis L. Gonthier, Avon; Bernard Mariner, Bombon, both of France

[73] Assignee: Societe Nationale d'Etude et de Construction de Moteurs d'Aviation "S.N.E.C.M.A.", Paris, France

[21] Appl. No.: 133,432

[22] Filed: Dec. 15, 1987

[30] Foreign Application Priority Data

Dec. 17, 1986 [FR] France .................. 86 17633

[51] Int. Cl.4 .................. F01D 17/16; F04D 29/56
[52] U.S. Cl. .................. 415/150; 415/160
[58] Field of Search .............. 415/9, 147, 148, 149 R, 415/150, 151, 159, 160, 161, 162

[56] References Cited

U.S. PATENT DOCUMENTS

| 2,606,713 | 8/1952 | Bauger | 415/160 |
| 2,842,305 | 7/1958 | Eckenfels et al. | 415/160 X |
| 2,933,234 | 4/1960 | Neumann | 415/160 |
| 3,695,777 | 10/1972 | Westphal et al. | 415/160 X |
| 3,841,788 | 10/1974 | Sljusarev et al. | 415/160 X |
| 3,954,349 | 5/1976 | Abild | 415/160 X |
| 4,035,101 | 7/1977 | Glenn | 415/160 |
| 4,050,844 | 9/1977 | Miller et al. | 415/147 |

FOREIGN PATENT DOCUMENTS

| 822695 | 1/1938 | France . |
| 1021872 | 2/1953 | France . |
| 1190067 | 12/1959 | France . |
| 1277868 | 12/1961 | France . |
| 2426824 | 1/1976 | Fed. Rep. of Germany . |

Primary Examiner—Robert E. Garrett
Assistant Examiner—Joseph M. Pitko
Attorney, Agent, or Firm—Oblon, Fisher, Spivak, McClelland & Maier

[57] ABSTRACT

The connection between the actuating link of each variably settable vane of a compressor flow straightener in a turbine plant and the control ring for the vanes comprises a cylindrical roller rotatably mounted in a bore in the ring parallel to the axis of the compressor, the roller having a radial bore registering with a radial opening in the ring and housing the shaft of the link as a rotary and sliding fit. This arrangement prevents any torsional strain on the link during operation, and is found to be substantially simpler and more reliable than the known arrangements.

5 Claims, 4 Drawing Sheets

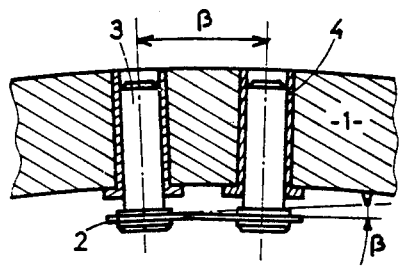
FIG:1 *PRIOR ART*
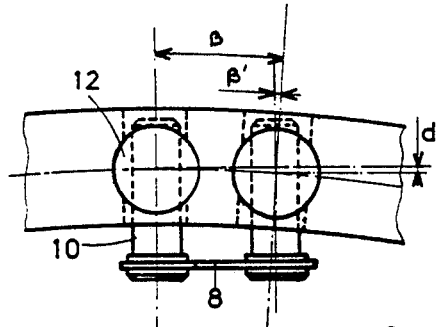
FIG:3
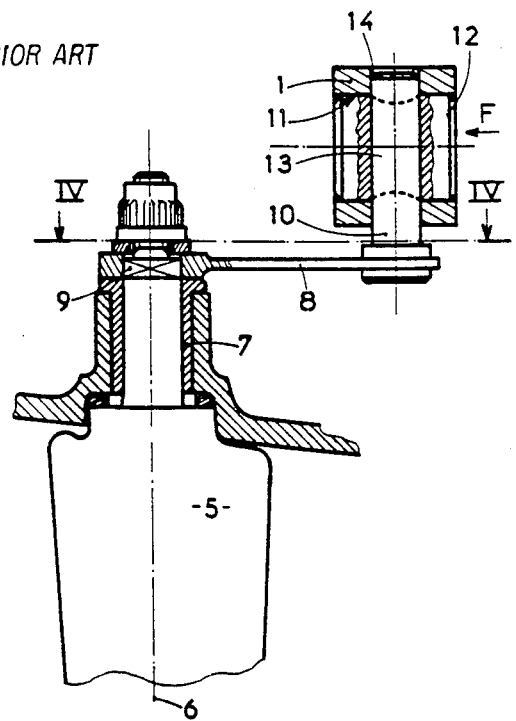
FIG:2
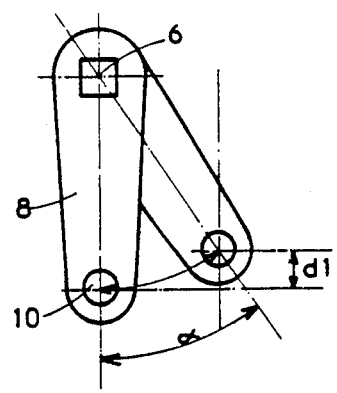
FIG:4

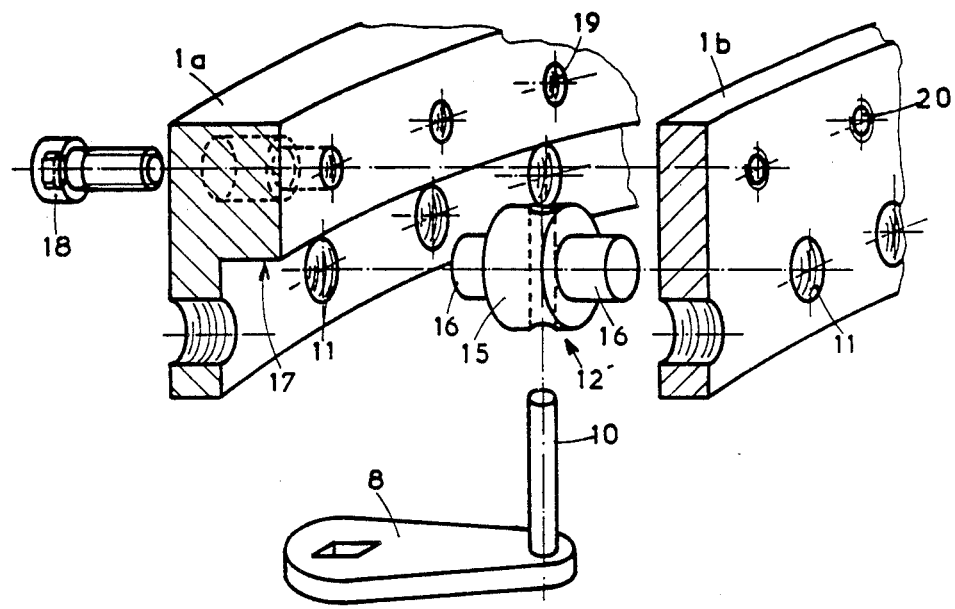
FIG:5
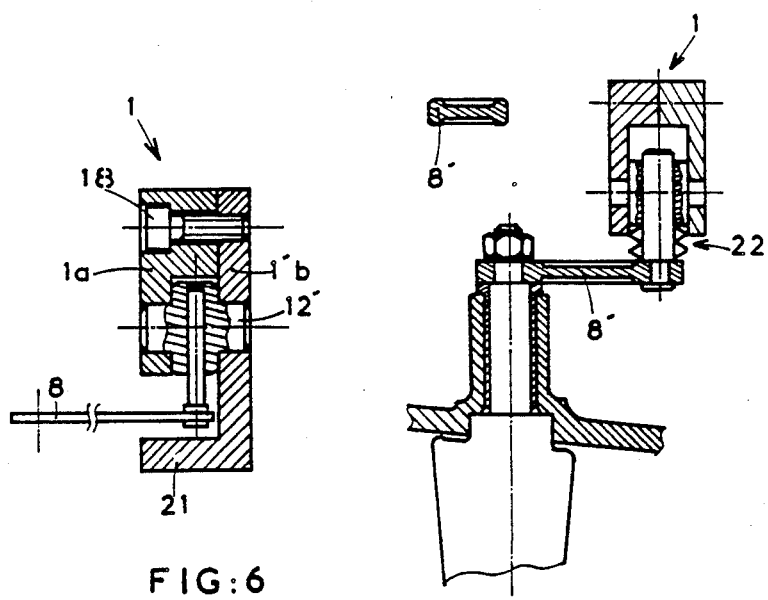
FIG:6
FIG:7

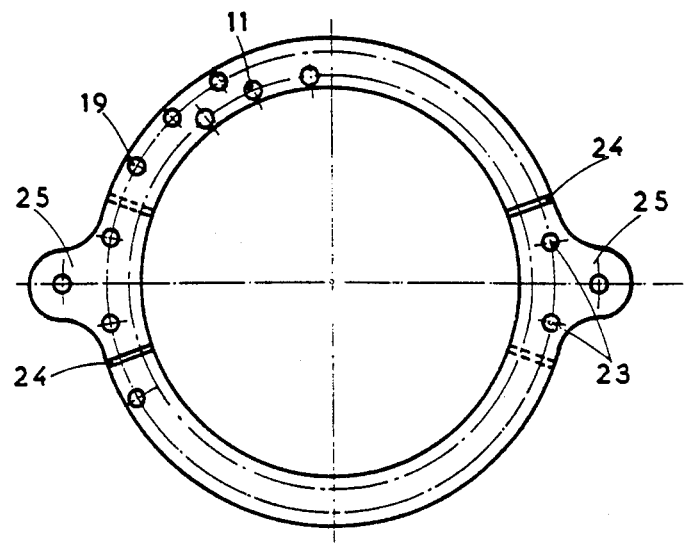
FIG:8a
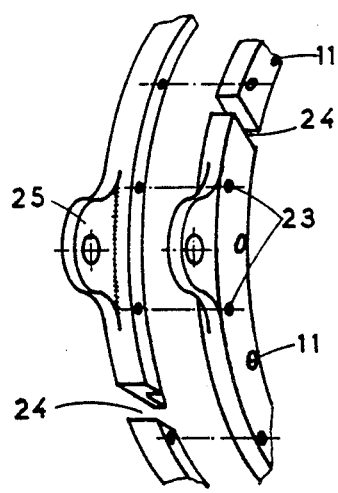
FIG:8b
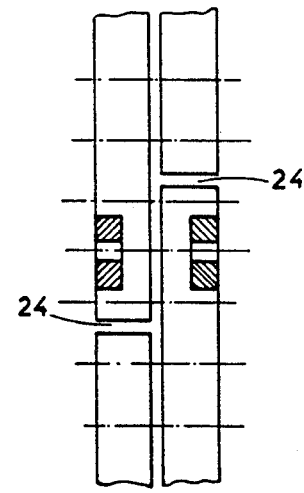
FIG:8c

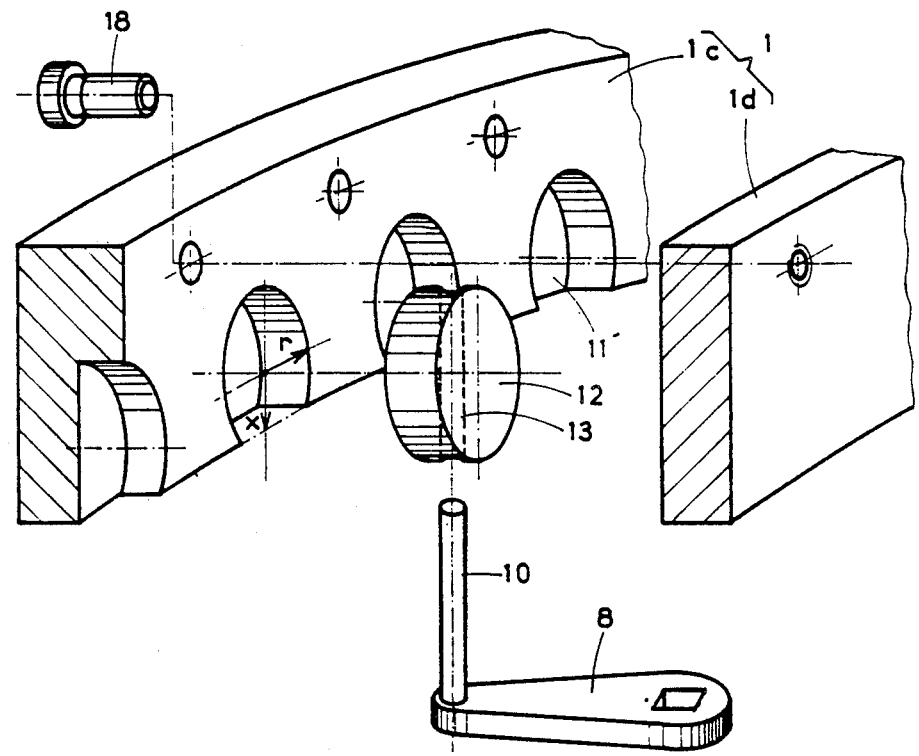
FIG:9
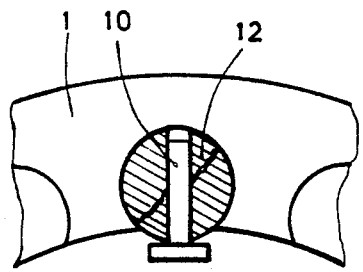
FIG:10a
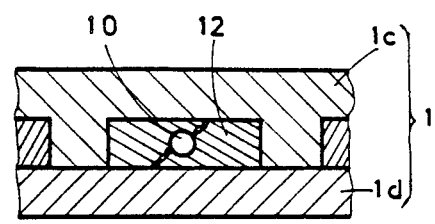
FIG:10b

CONTROL MECHANISM FOR VARIABLY SETTABLE VANES OF A FLOW STRAIGHTENER IN A TURBINE PLANT

BACKGROUND OF THE INVENTION

1. Field of the Invention

The present invention relates to means for controlling the variable setting of the flow straightener vanes for the compressors of turbine plants, especially aircraft turbojet engines, in the case of variably settable flow-straighteners with a substantial displacement or adjustment range.

2. Summary of the Prior Art

There are in existence two types of control rings for variably settable flow-straighteners:

(a) control rings which are integral with the compressor casing and move circumferentially on bearings machined on the outside of the casing; and (b) control rings which are external to the compressor casing and move both circumferentially and linearly in an upstream or downstream direction following the angular movement of the control links connected to the vanes of the flow-straightener, the only points of contact between the ring and the outside of the casing being, for example, shoes intended to maintain the ring concentrically with respect to the casing.

We are concerned with this second type of control ring. In engines in which the variably settable vanes require only a small angular adjustment (as in the state of the art shown in FIG. 1), the control links are mounted so that shafts of the links rotate in radial guide bushes on the ring and are subjected to a twisting $\beta$ proportional to the set angle of the vanes. If the displacement is very small, as shown in FIG. 1, this twisting of the links is acceptable.

If the displacement is more substantial, U.S. Pat. No. 4,050,844 proposes inserting between the shaft of each link and the radial bush of the ring a barrel-shaped spring or an elastomeric buffer of the same shape in order to withstand the torque. However, these intermediate members are crimped on the shaft of the link and when they wear or break, it is the entire link that has to be changed.

On the other hand, when the angle of adjustment of the vanes is substantial and the diameter of the compressor is small, which is more and more frequently the case in supersonic engines with high compression ratios and small overall size, the above-mentioned arrangements are no longer usable as the torques that have to be borne by the intermediate members are too great.

French Patent No. 1 190 067 suggests placing on the shaft of each link a ball joint to replace the torsional strain by a rotation of the ball joint on outer rings with spherical bearings. In addition to their wear problems, these universal ball joints require the provision of a great number of parts and are often heavy and cumbersome.

It is an object of the present invention, therefore, to provide means for controlling the setting of flow-straightener vanes having a large angle of adjustment which is simpler and lighter than ball joint mechanisms and which, nevertheless, imposes no torsional stress on the control links.

SUMMARY OF THE INVENTION

To this end, the invention provides a control mechanism for variably settable vanes of a compressor flow straightener of a turbine plant comprising a circular ring mounted for rotation about the longitudinal axis of said compressor, a plurality of links, each said link having first and second ends, and a radially oriented shaft at said second end thereof, first connection means rigidly connecting said first end of each said link to a corresponding one of said vanes, and second connection means pivotally connecting said shaft at said second end of each said link to said ring whereby rotation of said ring about said longitudinal axis of said compressor pivots said links to vary the angle of said vanes, said second connection means of each said link comprising means defining an axially extending bore in said ring having an axis parallel to said longitudinal axis, a cylindrical roller rotatably mounted in said axially extending bore, a port opening radially into said axially extending bore from the periphery of said ring, and means defining a radial bore in said roller, said radial bore being exposed by said port and receiving said shaft of said link whereby said shaft is rotatable and slidable in said radial bore.

The arrangement of the cylindrical roller connecting the shaft of each link to the control ring provides the connection with two degrees of freedom in rotation and one degree of freedom in translation, and thus avoids the imposition of any torsional stress on the links when the ring is rotated to adjust the vanes.

In a preferred embodiment of the invention, said control ring is formed by a pair of annular members and means detachably securing said annular members to each other, each of said annular members having means defining a plurality of circumferentially spaced axially extending bores coaxially aligned with said bores of the other member, and said annular members defining a radially open gap between said aligned bores, and wherein said cylindrical roller of said second connection means of each said link comprises a pair of smaller diameter end portions separated by a larger diameter central portion, said end portions forming journals which are rotatably received in a pair of said aligned bores of said annular members, and said central portion being located in said radially open gap therebetween and containing said radial bore of said roller.

BRIEF DESCRIPTION OF THE DRAWINGS

FIG. 1 is a fragmentary, part-sectional view illustrating the connection of a link to the control ring of a known form of control mechanism;

FIG. 2 is a part-sectional view illustrating the connection of a link to a vane and to the control ring in a first embodiment of the control arrangement in accordance with the invention;

FIG. 3 is a view looking in the direction of the arrow F in FIG. 2;

FIG. 4 is a plan view of the link taken on line IV—IV of FIG. 2 and showing the movement of the link during operation;

FIG. 5 is an exploded fragmentary perspective view showing the construction of the control ring and the connection of a link thereto in a second embodiment of a control mechanism in accordance with the invention;

FIG. 6 is a sectional view showing a modification of the second embodiment;

FIG. 7 is a view similar to that of FIG. 2, but showing a further modification of the second embodiment;

FIGS. 8a, 8b, and 8c are views illustrating further details of the construction of the control ring of the second embodiment shown in FIG. 5;

FIG. 9 is a view similar to FIG. 5 but showing another embodiment of the mechanism in accordance with the invention; and, FIGS. 10a and 10b are fragmentary sectional views at right angles to each other through the assembled ring of the example shown in FIG. 9, illustrating the situation where a roller of the mechanism becomes broken.

DESCRIPTION OF THE PREFERRED EMBODIMENTS

FIG. 1 shows a control ring 1 of a known form of control mechanism in which links 2 are each connected to the ring by a shaft 3 of the link which pivots in a radial guide bush 4 in the ring. The link 2 suffers a torsional strain $\beta$ equal to the angular displacement of the control ring when the ring is moved to adjust the vanes.

FIG. 2 shows a control mechanism in accordance with the invention. Part of a flow-straightener vane 5 of a compressor is shown mounted to rotate about its axis 6 in a bush 7 under the control of a link 8 secured to the shaft of the vane by a square driving connection at one end of the link. Crimped on the other end of the link 8 is a shaft 10 which extends radially with respect to the longitudinal axis of the compressor and is pivotally connected to the control ring 1 of the mechanism. For this purpose the ring 1 has axially extending bores 11 parallel to the longitudinal axis of the compressor, and cylindrical rollers 12 are rotatably disposed in the bores 11. Each roller is drilled with a bore 13 at right angles to the axis of the roller, and this bore 13 is disposed to register with a radial bore 14 of the ring 1 so that a shaft 10 of a link is received as a sliding and rotatable fit in the bore 13.

When the control ring is actuated and rotated through an angular displacement $\beta$ (FIG. 3), an axial displacement d1 of the ring is produced along with an angular displacement $\alpha$ (FIG. 4) of the link and vane. These displacements, instead of exerting a torque on the link, are accommodated by a sliding movement of amplitude "d" of the shaft 10 in the bore 13 of the roller 12, by a rotation through an angle $\beta'$ of the roller 12 in the bore 11, and by the shaft 10 rotating by the angle $\alpha$ in the bore 13.

FIG. 5 shows a second embodiment of the invention intended to secure the rollers in the control ring assembly. In this embodiment the control ring is constructed in two annular parts 1a and 1b, one upstream and the other downstream, and each roller 12' has a central part 15 of larger diameter between two end journal parts 16 of smaller diameter, the central part being drilled with the bore 13 at right angles to the axis of symmetry of the roller 12'. The two annular parts 1a and 1b of the control ring are secured together by screws 18 extending through bores 19 in the part 1a into tapped bores 20 in the part 1b, and each part is further provided with a circumferentially spaced array of axially extending bores 11. The bores 11 of the part 1a are aligned with the bores 11 of the part 1b when the parts are secured together, and house the journals 16 of the rollers 12', the upstream part 1a of the ring being provided with a rebate 17 at its radially inner downstream edge to accommodate the larger central part 15 of each roller 12'. The advantage of this embodiment is that, in the event of accidental breakage of a link, the roller 12' is prevented from coming out of its housing in the ring 1.

In a modification of this arrangement shown in FIG. 6, the downstream part 1b of the ring is replaced by a modified part 1'b having a cross-section which is L-shaped to provide a radially inner flange 21 which partly covers the link 8. With this arrangement, in the event of accidental breakage of a link 8, the broken part of the link will be held in position in the roller 12' by the flange 21 of the ring part 1'b.

To reduce the risk of a link breaking to a minimum, the links 8 may be provided with an I-shaped section 8' such as shown in FIG. 7, which, moreover, shows another modification. In this embodiment the two annular parts of the control ring are symmetrical, and each link has a resilient washer 22 disposed around its shaft between the upper face of the link 8 and the roller 12' as shown. The purpose of these washers 22 is to ensure the self-centering of the control ring 1 on the control links 8. Each washer 22 may be a simple washer of elastomeric material or a stack of alternately arranged Belleville washers.

In another alternative arrangement which is not shown, the centering of the ring may be made on a bearing of the engine casing by radial guide shoes.

In practice the two ring parts 1a and 1b may be machined on a lathe. Then the bores 19 and 20 for receiving the screws 18 are machined, as well as bores 23 to house centering pins intended to facilitate the assembly of the ring parts 1a and 1b one to the other. Finally each ring part is cut diametrically at 24 into two identical halves. The control forks 25 for the connection of a hydraulic or screw actuator to effect the rotation of the control ring may be formed integrally with the ring or may be formed separately and fixed to the ring by securing screws of two half-ring parts.

In an alternative embodiment shown in FIG. 9 the ring 1 is also formed of two annular parts 1c and 1d, and one part 1c has blind axial recesses 11' in one face for housing the rollers 12, which in this case are in the form of plain cylindrical discs each drilled with a bore 13 perpendicularly to the axis of revolution to house the link shaft 10. The recesses 11' of the part 1c are machined close to its radially inner edge with their centers at a distance x from said edge smaller than the radius r of the recesses and rollers so that the recesses thus formed are open at the inner edge to provide a passage for the link shaft 10. In this embodiment the annular part 1d is screwed at 18 to the part 1c after the positioning of the rollers 12 in the recesses 11', and acts as a cover.

The advantage of this embodiment lies in the fact that, in the event of breakage of a roller, such as shown in FIGS. 10a and 10b, the broken parts can remain confined in the ring and will not hinder the operation of the mechanism. Furthermore, the roller disc 12, having a simpler shape than the roller 12' of FIG. 5, has no journals at which incipient breaks could be created, thus reducing the likelihood of roller breakage.

As will be appreciated from the various embodiments hereinbefore described, the invention permits connection means between link and control ring to be simplified and lightened, particularly by making it possible to make the rollers, for example, from a moulded composite material of the type known by the trade name "VESPEL SP 21" or from Z100 DC 17 steel.

What is claimed is:

1. Control mechanism for variably settable vanes of a compressor flow straightener of a turbine plant comprising
    a circular ring mounted for rotation about the longitudinal axis of said compressor,
    a plurality of links, each said link having
        first and second ends, and
        a radially oriented shaft at said second end thereof,
    first connection means rigidly connecting said first end of each said link to a corresponding one of said vanes,
    and second connection means pivotally connecting said shaft at said second end of each said link to said ring whereby rotation of said ring about said longitudinal axis of said compressor pivots said links to vary the angle of said vanes, said second connection means of each said link comprising
        means defining an axially extending bore in said ring having an axis parallel to said longitudinal axis,
        a cylindrical roller rotatably mounted in said axially extending bore,
        a port opening radially into said axially extending bore from the periphery of said ring, and
        means defining a radial bore in said roller, said radial bore being exposed by said port and receiving said shaft of said link whereby said shaft is rotatable and slidable in said radial bore.

2. Control mechanism according to claim 1, wherein said control ring is formed by a pair of annular members and means detachably securing said annular members to each other, each of said annular members having means defining a plurality of circumferentially spaced axially extending bores coaxially aligned with said bores of the other member, and said annular members defining a radially open gap between said aligned bores, and wherein said cylindrical roller of said second connection means of each said link comprises a pair of smaller diameter end portions separated by a larger diameter central portion, said end portions forming journals which are rotatably received in a pair of said aligned bores of said annular members, and said central portion being located in said radially open gap therebetween and containing said radial bore of said roller.

3. Control mechanism according to claim 2, wherein one of said annular members of said control ring has a portion with an L-shaped section partly covering said second end of each said link.

4. Control mechanism according to claim 1, wherein at least one resilient washer is disposed around said shaft at said second end of each said link, said washer acting between said link and said cylindrical roller to center said ring with respect to said links.

5. Control mechanism according to claim 1, wherein said cylindrical roller is made of a moulded composite material.

* * * * *

UNITED STATES PATENT AND TRADEMARK OFFICE
CERTIFICATE OF CORRECTION

PATENT NO. : 4,773,821
DATED : September 27, 1988
INVENTOR(S) : Francis Gonthier, et al It is certified that error appears in the above-identified patent and that said Letters Patent is hereby corrected as shown below:

On the title page second inventor's name should read

-- Bernard Marinier --.

Signed and Sealed this

Fourteenth Day of March, 1989

Attest:

DONALD J. QUIGG

Attesting Officer      Commissioner of Patents and Trademarks